United States Patent
Chen et al.

(10) Patent No.: US 6,416,819 B1
(45) Date of Patent: Jul. 9, 2002

(54) METHOD OF PREPARING LOW-TEMPERATURE-CURE POLYMER COMPOSITION

(75) Inventors: Jiann H. Chen, Fairport; Joseph A. Pavlisko, Pittsford; Charles C. Anderson, Penfield; Robert A. Lancaster, Hilton, all of NY (US)

(73) Assignee: Nex Press Solutions LLC, Rochester, NY (US)

( * ) Notice: Subject to any disclaimer, the term of this patent is extended or adjusted under 35 U.S.C. 154(b) by 0 days.

(21) Appl. No.: 09/608,289

(22) Filed: Jun. 30, 2000

(51) Int. Cl.$^7$ ................................................ B05D 3/02
(52) U.S. Cl. ........................ 427/387; 428/421; 428/422; 428/447; 524/432; 524/544; 524/567; 524/784; 524/858; 526/242; 528/401; 528/38
(58) Field of Search ...................... 525/104; 524/567, 524/432, 784, 858, 544; 526/242; 528/401; 427/387; 428/447, 421, 422

(56) References Cited

U.S. PATENT DOCUMENTS

| | | | |
|---|---|---|---|
| 4,272,179 A | 6/1981 | Seanor | 355/3 FU |
| 4,373,239 A | 2/1983 | Henry et al. | 29/132 |
| 4,430,406 A | 2/1984 | Newkirk et al. | 430/99 |
| 4,518,655 A | 5/1985 | Henry et al. | 428/329 |
| 4,568,275 A | 2/1986 | Sakurai | 432/60 |
| 4,853,737 A | 8/1989 | Hartley et al. | 355/289 |
| 4,970,098 A | 11/1990 | Ayala-Esquilin et al. | 428/36.4 |
| 4,999,221 A | 3/1991 | Eigenbrod et al. | 427/195 |
| 5,157,445 A | 10/1992 | Shoji et al. | 355/284 |
| 5,253,027 A | 10/1993 | Goto | 355/290 |
| 5,269,740 A | 12/1993 | Fitzgerald et al. | 492/56 |
| 5,292,562 A | 3/1994 | Fitzgerald et al. | 428/35.8 |
| 5,292,606 A | 3/1994 | Fitzgerald | 428/35.8 |
| 5,336,539 A | 8/1994 | Fitzgerald | 428/36.8 |
| 5,337,129 A | 8/1994 | Badesha | 355/275 |
| 5,464,698 A | 11/1995 | Chen et al. | 428/421 |
| 5,464,703 A | 11/1995 | Ferrar et al. | 428/421 |
| 5,466,533 A | 11/1995 | Fitzgerald et al. | 428/477 |
| 5,474,821 A | 12/1995 | Kass | 428/35.8 |
| 5,474,852 A | 12/1995 | Fitzgerald et al. | 428/447 |
| 5,480,724 A | 1/1996 | Fitzgerald et al. | 428/477 |
| 5,547,759 A | 8/1996 | Chen et al. | 428/421 |
| 5,582,917 A | 12/1996 | Chen et al. | 428/421 |
| 5,595,823 A | 1/1997 | Chen et al. | 428/421 |
| 5,599,631 A | 2/1997 | Chen et al. | 428/421 |
| 5,736,250 A | * 4/1998 | Heeks et al. | 428/447 |
| 5,876,636 A | 3/1999 | Schlucter, Jr. et al. | 252/520.1 |
| 5,919,886 A | 7/1999 | Matsuda et al. | 525/276 |
| 5,948,479 A | 9/1999 | Adam et al. | 427/388.4 |
| 6,020,450 A | 2/2000 | Matsuda et al. | 528/42 |
| 6,035,781 A | 3/2000 | Badesha et al. | 101/217 |
| 6,041,210 A | * 3/2000 | Chen et al. | 399/333 |
| 6,068,931 A | 5/2000 | Adam et al. | 428/469 |
| 6,225,409 B1 | * 5/2001 | Davis et al. | 524/401 |

FOREIGN PATENT DOCUMENTS

EP  0 344 481  6/1989  .......... G03G/15/20

OTHER PUBLICATIONS

"Segmented Organosiloxane Copolymers", Polymer, 1984, V.25, pp. 1800–1806, by Yilgor et al.

"THV Fluoroplastic" by D.E. Hull, B.V. Johnson, I.P. Rodricks and J.B. Staley, Modern Fluoropolymers, edited by John Scheirs, 1997.

"Encyclopedia of Polymer Science and Engineering", vol. 17, pp. 829–835 on Thermoplastics and Fluoroplastics (J. Wiley & Sons 1989).

"Encyclopedia of Polymer Science and Engineering", vol. 7, pp. 257–269 on Fluorocarbon Elastomers (J. Wiley & Sons 1987).

Kirk–Othmer "Encyclopedia of Chemical Technology", vol. 8, pp. 990–1005 on Fluorocarbon Elastomers (J. Wiley & Sons 1993).

* cited by examiner

Primary Examiner—Robert Dawson
Assistant Examiner—Marc S Zimmer

(57) ABSTRACT

A method of preparing a composition containing a fluorocarbon thermoplastic random copolymer comprising the steps of:

(A) providing a mixture having:
  (i) a fluorocarbon thermoplastic random copolymer having subunits of:

$-(CH_2CF_2)x-$, $-(CF_2CF(CF_3)y-$, and $-(CF_2 CF_2)z-$, wherein
  x is from 1 to 50 or 60 to 80 mole percent,
  y is from 10 to 90 mole percent,
  z is from 10 to 90 mole percent,
  x+y+z equals 100 mole percent;
  (ii) a filler comprising zinc oxide;
  (iii) a curable amino functional polydimethyl siloxane copolymer comprising aminofunctional units selected from the group consisting of (aminoethylaminopropyl) methyl, (aminopropyl) methyl and (aminopropyl) dimethyl; and
  (iv) antimony-doped tin oxide particles;
  (v) a bisphenol residue curing agent; and
(B) curing the mixture for 5 to 10 hours at a temperature in the range of 25° C. to 275° C.

20 Claims, No Drawings

METHOD OF PREPARING LOW-TEMPERATURE-CURE POLYMER COMPOSITION

CROSS REFERENCE TO RELATED APPLICATIONS

Reference is made to commonly assigned, copending U.S. patent application Ser. Nos.:

Ser. No. 09/609,562 by Chen et al., now U.S. Pat. No. 6,355,354, filed of even date herewith, entitled "FLUOROCARBON THERMOPLASTIC RANDOM COPOLYMER COMPOSITION CURABLE AT LOW TEMPERATURES";

Ser. No. 09/608,362 by Chen et al., filed of even date herewith, entitled "FUSER MEMBER WITH LOW-TEMPERATURE-CURE OVERCOAT";

Ser. No. 09/608,818 by Chen et al., filed of even date herewith, entitled "METHOD OF CURING A FUSER MEMBER OVERCOAT AT LOW TEMPERATURES".

FIELD OF THE INVENTION

This invention relates to a method of preparing compositions containing a fluorocarbon thermoplastic random copolymer. More particularly, the invention relates to a method of preparing compositions containing a fluorocarbon thermoplastic random copolymer, zinc oxide, an aminosiloxane, and antimony-doped tin oxide particles. Such compositions are capable of being cured at lower temperatures compared with conventional fluorocarbon polymer compositions and are useful as coatings, sheets, or films where high temperature resistance is required.

BACKGROUND OF THE INVENTION

Fluororesins, including both fluorocarbon elastomers and fluorocarbon thermoplastics, are widely used in the form of sheet, film, coatings and laminates in various fields due to their characteristic properties such as good heat resistance, good chemical resistance and good weather resistance. These materials find applications as gaskets and seals in automotive fuel delivery, engine, and powertrain systems, tank and pipe liners, release layers on compression molds, layers on electrophotographic toner fuser rollers or belts, valve stem and rotating shaft sealant coatings, roller and bearing coatings, and sealants for porous materials such as ceramics and fabric, for example. In addition to their characteristic resistance to heat, chemicals, and weather, and depending upon the particular application these fluororesin compositions may also need to provide appropriate frictional characteristics, abrasion and wear resistance, flexibility, processability, and adhesion to a particular substrate.

Polyfluorocarbon elastomers, such as vinylidene fluoride-hexafluoropropylene copolymers, are tough, wear resistant and flexible elastomers that have excellent high temperature resistance, but relatively high surface A energies, which compromise applications where release properties are critical, for example as release layers on compression molds or outer layers on electrophotographic toner fuser members.

Fluorocarbon resins like polytetrafluoroethylene (PTFE) or fluorinated ethylenepropylene (FEP) are fluorocarbon thermoplastics which have excellent release characteristics due to very low surface energy. Fluorocarbon thermoplastic resins are, however, less flexible and elastic than fluorocarbon elastomers and often require high temperature curing for long time periods to sinter the polymer into a continuous and useful layer or sheet.

Both fluorocarbon elastomers and fluorocarbon thermplastics have been used to prepare high temperature resistant surfaces. For example, U.S. Pat. No. 4,999,221 describes a process for powder coating a substrate with a fluoroplastic material to provide a heat resistant surface layer. U.S. Pat. Nos. 5,919,886 and 6,020,450 describe a room temperature curable fluoropolymer composition containing an organosilicon compound and a condensation accelerator having improved heat resistance and weatherability.

U.S. Pat. Nos. 5,948,479 and 6,068,931 describe composite materials for self-lubricating slide bearings containing a fluorothermoplastic composite overlayer on a porous metal bearing.

Fluororesin-containing compositions have also been successfully employed in various electrostatographic applications. For example, U.S. Pat. Nos. 4,568,275 and 5,599,631 disclose a fuser roll having a layer of fluorocarbon elastomer and a fluorinated resin powder. However, the fluorocarbon resin tends to phase separate from the fluorocarbon elastomer thereby diminishing performance.

U.S. Pat. No. 4,853,737 discloses a fuser roll having an outer layer comprising cured fluorocarbon elastomers containing pendant amine functional polydimethylsiloxane that are covalently bonded to the backbone of the fluorocarbon elastomer. However, the amine functional polydimethylsiloxane tends to phase separate from the fluorocarbon elastomer.

U.S. Pat. No. 5,582,917 discloses a fuser roll having a surface layer comprising a fluorocarbon-silicone polymeric composition obtained by heating a fluorocarbon elastomer with a fluorocarbon elastomer curing agent in the presence of a curable polyfunctional poly(C1–6 alkyl) siloxane polymer. However, the resulting interpentrating network (IPN) has relatively high coefficient of friction and relatively low mechanical strength. After a period of use, the release property of the roller degrades and paper jams begin to occur.

U.S. Pat. No. 5,547,759 discloses a fuser roll having a release coating layer comprising an outermost layer of fluorocarbon resin uniquely bonded to a fluoroelastomer layer by means of a fluoropolymer containing a polyamideimide primer layer. Although the release coating layer has relatively low surface energy and good mechanical strength, the release coating layer lacks flexibility and elastic properties and can not produce high quality of images. In addition, sintering the fluorocarbon resin layer is usually accomplished by heating the coated fuser member to temperatures of approximately 350° C. to 400° C. Such high temperatures can have a detrimental effect on the substrate to which the fluorocarbon resin has been applied, especially, for example, if the substrate is a polymeric material. It would be desirable to provide a fluorocarbon composition that can be formed and/or cured without damaging the substrate to which it has been applied.

U.S. Pat. No. 5,595,823 discloses toner fusing members which have a substrate coated with a fluorocarbon random copolymer containing aluminum oxide. Although these toner fusing members have proved effective and have desirable thermal conductivity, they have a problem in that there can be toner contamination. The advantage of using the cured fluorocarbon thermoplastic random copolymer compositions is that they are effective for use with toner release agents which typically include silicone.

U.S. Pat. No. 6,035,780 describes a process to prepare a compatibilized blend of a fluoroelastomer and a polysiloxane useful for electrostatographic and liquid ink printing machine applications. The compatible blend is reportedly useful as a component of long-life fuser rolls, backing rolls, transfer and transfuse belts and rolls and bias charging and biastransfer rolls.

U.S. Pat. No. 5,464,698 discloses toner fusing members which have a substrate coated with a fluorocarbon random copolymer containing tin oxide. Although these toner fusing members have proved effective and have desirable thermal conductivity, they have a problem in that there can be toner contamination.

Commonly-assigned U.S. Pat. No. 6,041,210 describes a toner fusing member having an overcoat layer including electrically conductive fine powders having a weight percent between about 30 to 80 weight percent. Although these toner fusing members have proved effective in suppressing electrostatic charge build up, they have a problem in that there can be toner contamination.

As evidenced by the above description, fluororesin compositions have been widely utilized in a variety of critical applications requiring resistance to severe or aggressive environments, abrasion and wear resistance, surface lubricity, and release properties. However, it has been extremely difficult to provide a fluororesin composition which simultaneously provides most or all of these characteristics and can be cured at temperatures as low as room temperature. It is toward a solution to this problem that the present invention is directed.

SUMMARY OF THE INVENTION

The present invention provides a method of preparing a composition containing a fluorocarbon thermoplastic random copolymer that is easily processed into a coating or sheet having improved release properties, surface lubricity, mechanical strength, and low curing temperatures. The method comprises the steps of:

(A) providing a mixture having:
 (i) a fluorocarbon thermoplastic random copolymer having subunits of:

—$(CH_2CF_2)x$—, —$(CF_2CF(CF_3)y$—, and —$(CF_2CF_2)z$—, wherein
 x is from 1 to 50 or 60 to 80 mole percent,
 y is from 10 to 90 mole percent,
 z is from 10 to 90 mole percent,
 x+y+z equals 100 mole percent;
 (ii) a filler comprising zinc oxide;
 (iii) a curable amino functional polydimethyl siloxane copolymer comprising aminofunctional units selected from the group consisting of (aminoethylaminopropyl) methyl, (aminopropyl) methyl and (aminopropyl) dimethyl; and
 (iv) antimony-doped tin oxide particles;
 (v) a bisphenol residue curing agent; and
(B) curing the mixture for 5 to 10 hours at a temperature in the range of 25° C. to 275° C.

The compositions prepared as described above are suitable for use as a coating on a variety of substrates or as a free standing slab or film. The coatings may be applied to substrates such as metals, polymers, ceramics, or glass. The substrate may be in essentially any form or shape, for example, a sheet, a web, a roller, a machined part, etc. When applied to a substrate, the compositions are coated from an organic solvent, then dried at ambient or elevated temperature, and then cured as described above. Hence, the invention also provides a method of preparing a coating composition for a substrate comprising the steps of:

(A) providing a composition having:
 (i) a fluorocarbon thermoplastic random copolymer having subunits of:

$(CH_2CF_2)x$—, —$(CF_2CF(CF_3)y$—, and —$(CF_2CF_2)z$—, wherein
 x is from 1 to 50 or 60 to 80 mole percent,
 y is from 10 to 90 mole percent,
 z is from 10 to 90 mole percent,
 x+y+z equals 100 mole percent;
 (ii) a filler comprising zinc oxide;
 (iii) a curable amino functional polydimethyl siloxane copolymer
 comprising aminofunctional units selected from the group consisting of (aminoethylaminopropyl) methyl, (aminopropyl)
 methyl and (aminopropyl) dimethyl; and
 (iv) antimony-doped tin oxide particles; and
 (v) a bisphenol residue curing agent;
(3) providing a substrate;
(C) coating the substrate with the composition in an organic medium;
(D) allowing the composition to dry on the substrate at ambient or
 elevated temperatures; and
(E) curing the composition for 5 to 10 hours at a temperature in the
 range of 25° C. to 275° C.

The composition may also be cured for 5 to 10 hours at a temperature in the range of 25° C. to 120° C. Alternatively, the composition may be cured for 5 to 10 hours at a temperature in the range of 25° C. to 50° C. Preferably, the composition is cured for 5–10 hours a temperature of about 25° C.

The aminosiloxane is an amino functional polydimethyl siloxane copolymer comprising aminofunctional units selected from the group consisting of (aminoethylaminopropyl) methyl, (aminopropyl) methyl and (aminopropyl) dimethyl.

Optionally, the composition of the invention may further contain a fluorinated resin selected from the group of polytetrafluoroethylene or fluoroethylenepropylene having a number average molecular weight of between 50,000 and 50,000,000. The composition may further contain carbon black.

As will be demonstrated through examples, compositions comprising an unfilled fluorocarbon thermoplastic random copolymer have poor mechanical properties. However, it has been surprisingly found in the present invention that a fluorocarbon thermoplastic random copolymer containing zinc oxide filler, an aminosiloxane polymer, and a bisphenol residue curing agent provides a composition having improved mechanical properties. It was particularly surprising that the addition of antimony-doped tin oxide particles to these compositions significantly reduced the temperatures required for curing.

A further advantage of the present invention is that the addition of specific release additives such as fluorinated resins significantly improves the frictional characteristics of the fluorocarbon thermoplastic random copolymer-containing compositions.

DETAILED DESCRIPTION OF PARTICULAR EMBODIMENTS

The compositions of the invention contain a fluorocarbon thermoplastic random copolymer that is cured by a curing agent. The fluorocarbon random copolymer has subunits of:

—(CH$_2$CF$_2$)x—, —(CF$_2$CF(CF$_3$)y—, and —(CF$_2$CF$_2$)z—, wherein x is from 1 to 50 or 60 to 80 mole percent, y is from 10 to 90 mole percent, z is from 10 to 90 mole percent, x+y+z equal 100 mole percent.

—(CH$_2$CF$_2$) is (vinylidene fluoride subunit ("VF$_2$")),

—(CF$_2$CF(CF$_3$) is (hexafluoropropylene subunit ("FP")), and

—(CF$_2$CF$_2$) is (tetrafluoroethylene subunit ("TFE")).

The curing agent has a bisphenol residue. By the term bisphenol residue is meant bisphenol or a derivative such as bisphenol AF.

The composition further includes a particulate filler having zinc oxide, an aminosiloxane, and antimony-doped tin oxide particles.

The aminosiloxane is an amino functional polydimethyl siloxane copolymer comprising aminofunctional units selected from the group consisting of (aminoethylaminopropyl) methyl, (aminopropyl) methyl and (aminopropyl) dimethyl.

In these formulas, x, y, and z are mole percentages of the individual subunits relative to a total of the three subunits (x+y+z), referred to herein as "subunit mole percentages". The curing agent can be considered to provide an additional "cure-site subunit", however, the contribution of these cure-site subunits is not considered in subunit mole percentages. In the fluorocarbon thermoplastic copolymer, x has a subunit mole percentage of from 1 to 50 or 60 to 80 mole percent, y has a subunit mole percentage of from 10 to 90 mole percent, and z has a subunit mole percentage of from 10 to 90 mole percent. In a currently preferred embodiment of the invention, subunit mole percentages are: x is from 30 to 50 or 70 to 80, y is from 10 to 20, and z is from 10 to 50; or more preferably x is from 40 to 50, y is from 10 to 15, and z is 40 to 50. In the currently preferred embodiments of the invention, x, y, and z are selected such that fluorine atoms represent at least 65 percent of the total formula weight of the VF$_2$, HFP, and TFE subunits.

A curable amino functional polydimethyl siloxane copolymer is used in the present invention and is cured with the fluorocarbon thermoplastic random copolymer to produce a material suitable for use in a variety of applications including seals and gaskets, heat resistant coatings for belts, rollers, and bearings, release layers for compression molds and electrostatographic fuser members, etc.

An optional release additive such as a fluorinated resin can be added to the fluorocarbon thermoplastic random copolymer-containing compositions to further improve the surface lubricity of the compositions.

The conditions employed for curing are largely determined by the particular application for the cured fluorocarbon thermoplastic random copolymer-containing composition. For example, when the compositions are prepared as a slab or free standing film, higher temperatures and longer curing times may be employed. When the compositions are applied as a coating on a substrate, particularly polymeric substrates, lower curing temperatures and shorter curing times may be more appropriate. In a preferred embodiment, the substrate is either a metal or a ceramic, and the fluorocarbon thermoplastic random copolymer-containing mixtures are cured for 5–10 hours at a temperature of 25° C. to 275° C. In another preferred embodiment, the substrate is either a metal or a ceramic, and the fluorocarbon thermoplastic random copolymer-containing mixtures are cured for 5–10 hours at a temperature of 25 to 120° C. In a yet another preferred embodiment, the substrate is either a plastics or a polyyrethane, and the fluorocarbon thermoplastic random copolymer-containing mixtures are cured for about 5–10 hours at a temperature of about 25° C.

A preferred class of curable amino functional polydimethyl siloxanes, based on availability, includes those having functional groups such as aminopropyl or aminoethylaminopropyl pendant from the siloxane backbone such as DMS-A11, DMS-A12, DMS-A15, DMS-A21 and DMS-A32 (sold by Gelest, Inc.) having a number average molecular weight between 850 and 27,000. Particularly preferred curable amino functional polydimethyl siloxanes are bis (aminopropyl) terminated poly(dimethylsiloxane). Such oligomers are available in a series of molecular weights as disclosed, for example, by Yilgor et al., "Segmented Organosiloxane Copolymer", Polymer, 1984, V.25, pp1800–1806. Other curable amino functional polydimethyl siloxanes which can be used are disclosed in U.S. Pat. Nos. 4,853,737 and 5,157,445, the disclosures of which are hereby incorporated by reference.

Preferred compositions of the invention have a ratio of aminosiloxane polymer to fluorocarbon thermoplastic random copolymer between about 0.01 and 0.2 to 1 by weight, preferably between about 0.05 and 0.15 to 1. The composition is preferably obtained by curing a mixture comprising from about 50–80 weight percent of a fluorocarbon thermoplastic copolymer, 5–20 weight percent, most preferably about 5–10 weight percent, of a curable amino functional polydimethyl siloxane copolymer, 1–5 weight percent of a bisphenol residue, 1–20 weight percent of a zinc oxide acid acceptor type filler, 3–20 weight percent of antimony-doped tin oxide particles, 0 to 10 weight percent of carbon black, and 10–50 weight percent of a fluorinated resin.

The compositions of the invention include a particulate filler comprising zinc oxide. The zinc oxide particles can be obtained from a convenient commercial source, e.g., Atlantic Equipment Engineers of Bergenfield, N.J. In a currently preferred embodiment, the particulate zinc oxide filler has a total concentration in the compositions of the invention of from about 1 to 20 parts per hundred parts by weight of the fluorocarbon thermoplastic random copolymer (pph). Concentrations of zinc oxide much greater than 20 parts by weight will render the composition to stiff. In a particular embodiment of the invention, the composition has 3 to 15 pph of zinc oxide.

The particle size of the zinc oxide filler does not appear to be critical. Particle sizes anywhere in the range of 0.1 to 100 micrometers have been found to be acceptable. In the examples presented below the zinc oxide particles were from 1 to 40 micrometers in diameter.

The compositions of the invention also include antimony-doped tin oxide particles. These particles can be obtained from a convenient commercial source, e.g., Keeling & Walker, Stoke-on-Trent, UK; DuPont Co; or Mitsubishi Metals Inc., Japan. In a currently preferred embodiment, the antimony-doped tin oxide particles have a total concentration in the compositions of the invention of from about 3 to 20 parts per hundred parts by weight of the fluorocarbon thermoplastic random copolymer (pph). In a particularly preferred embodiment of the invention, the composition has 3 to 15 pph of antimony-doped tin oxide particles.

The particle size of the antimony-doped tin oxide particles does not appear to be critical. Particle sizes anywhere in the range of 0.05 to 10 micrometers are suitable. In the examples presented below the tin oxide particles were about 0.4 micrometers in diameter. The morphology or shape of the particles is not critical, for example, the particles may be essentially spherically in shape (granular) or they may be acicular in shape (e.g., a fiber or whisker)

The antimony concentration of the antimony-doped tin oxide particles is preferably 1 to 15 weight percent, most preferably 3 to 10 weight percent. In the examples presented below the antimony-doped tin oxide particles contained 6 to 9 weight percent antimony.

It was surprisingly found that the addition of the antimony-doped tin oxide particles to the fluorocarbon thermoplastic random copolymer compositions greatly reduced the temperatures needed to cure the fluoropolymer. While not wanting to be bound by theory, it is possible that the antimony acts as a catalyst for the curing reactions. Conventional fluoropolymer compositions that do not contain antimony-doped tin oxide parties have curing temperatures that are typically about 220 to 280° C., while the compositions of the invention may be cured at temperatures as low as room temperature.

The compositions of the invention optionally contain a carbon black added at a concentration of 0 to 10 parts per hundred parts of the fluorocarbon thermoplastic random copolymer. Any conventional carbon black may be used, for example Thermax™ N-990 available from R. T.Vanderbilt Co.

To prepare the compositions of the invention, the zinc oxide particles and antimony-doped tin oxide particles are mixed with the uncured fluorocarbon thermoplastic random copolymer, aminosiloxane, a bisphenol residue curing agent, and any other additives, such as fluorinated resin and carbon black, and cured. The fluorocarbon thermoplastic random copolymer is cured by crosslinking with basic nucleophile addition curing. Basic nucleophilic cure systems are well known and are discussed, for example, in U.S. Pat. No. 4,272,179. One example of such a cure system combines a bisphenol as the curing agent and an organophosphonium salt, as an accelerator. The fluorinated resins which include polyterafluoroethylene (PTFE) or fluoethylenepropylene (FEP) are commerically available from Dupont.

The curing agent is incorporated into the polymer as a cure-site subunit, for example, bisphenol residues. Other examples of nucleophilic addition cure systems are sold commercially as DLIK No. I (hexamethylenediamine carbamate) and DIAK No. 3 (N,N'-dicinnamylidene-1,6-hexanediamine) by Dupont.

Suitable fluorocarbon thermoplastic random copolymers are available commercially. In a particular embodiment of the invention, a vinylidene fluoride-co-tetrafluoroethylene co-hexafluoropropylene was used which can be represented as —(VF)(75)—(TFE) (10)—(HFP)(25)—. This material is marketed by Hoechst Company under the designation "THV Fluoroplastics" and is referred to herein as "THV". In another embodiment of the invention, a vinylidene fluoride-co-tetrafluoroethylene-co-hexafluoropropylene was used which can be represented as —(VF)(49)—(TFE) (41)—(HFP)(10)—. This material is marketed by Minnesota Mining and Manufacturing, St. Paul, Minn., under the designation "3M THV" and is referred to herein as "THV-200A". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV Fluoroplastics are set apart from other melt-processable fluoroplastics by a combination of high flexibility and low process temperatures. With flexural modulus values between 83 Mpa and 207 Mpa, THV Fluoroplastics are the most flexible of the fluoroplastics.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

Curing of the fluorocarbon thermoplastic random copolymer is carried out at much lower temperatures compared to the well known conditions for curing vinylidene fluoride based fluorocarbon elastomer copolymers. For example, the cure of fluorocarbon elastomers is usually for 12–48 hours at temperatures of about 220 to 250° C. Typically, fluorocarbon elastomer coating compositions are dried until solvent free at room temperature, then gradually heated to about 230° C. over 24 hours, then maintained at that temperature for 24 hours. By contrast, the cure of the fluorocarbon thermoplastic random copolymer compositions of the current invention is about 5 to 10 hours at a temperature of about 25–275° C., preferably 25–120° C., and most preferably 25–50° C.

In the practice of the present invention, a method of preparing a composition containing a fluorocarbon thermoplastic random copolymer comprises the steps of:

(a) providing a mixture having:
  (i) a fluorocarbon thermoplastic random copolymer having subunits of:

—(CH$_2$CF$_2$)x—, —(CF$_2$CF(CF$_3$)y—, and —(CF$_2$CF$_2$)z—, wherein
  x is from 1 to 50 or 60 to 80 mole percent,
  y is from 10 to 90 mole percent,
  z is from 10 to 90 mole percent,
  x+y+z equals 100 mole percent;
  (ii) a filler comprising zinc oxide;
  (iii) a curable amino functional polydimethyl siloxane copolymer comprising aminofunctional units selected from the group consisting of (aminoethylaminopropyl) methyl, (aminopropyl) methyl and (aminopropyl) dimethyl; and
  (iv) antimony-doped tin oxide particles;
  (v) a bisphenol residue curing agent;
(b) curing the mixture for 5–10 hours at a temperature in the range of 25° C. to 275° C.

The compositions prepared as described above are suitable for use as a coating on a variety of substrates or as a free standing slab or film. The coatings may be applied to substrates such as metals, polymers, ceramics, or glass. The substrate may be in essentially any form or shape, for example, a sheet, a web, a roller, a machined part, etc.

The invention is further illustrated by the following Examples and Comparative Example.

EXAMPLES 1–3

150 grams of Fluorocarbon thermoplastic random copolymer THV 200A, 1.05 grams of zinc oxide, 15.4 grams of fluorinated resin, and 4.90 grams of aminosiloxane were mixed into 230 grams of methyl ethyl ketone in a milling crock as indicated (amounts listed as parts per hundred parts of THV200A) in Table 1. THV200A is a commercially available fluorocarbon thermoplastic random copolymer which is sold by 3M Corporation. The zinc oxide particles can be obtained from convenient commercial source, e.g., Atlantic Equipment Engineers of Bergenfield, N.J. The amino siloxane DMS-A21 is commercially available from Gelest, Inc. The fluorinated resin is fluoroethylenepropylene (FEP) and is commercially available from Dupont. Into the above mixture antimony-doped tin oxide particles and carbon black were added and the formulations were mixed on a two-roll mill for 48 hours to form a dispersion (the amounts of the antimony-doped tin oxide particles and carbon black are given in Table 1). The antimony-doped tin oxide particles are Keeling & Walker Inc. CPM375 having an average particle size of about 0.4 µm and an antimony content of 6–9 weight %. The carbon black is Thermax™ N-990 available from R. T.Vanderbilt Co.

Each of the above dispersions were mixed with 1.05 grams (3 pph) of curative 50 (a bisphenol residue, DuPont) and roll milled for 2–3 minutes. The dispersions were then immediately cast into a film and allowed to dry for several hours. The resulting films had a thickness of several mils. Afterwards the cast films were cured using the conditions listed in Table 2.

COMPARATIVE EXAMPLE 1

To prepare Comparative Example 1 substantially the same procedures were followed as in Example 1–3, with the following exception. As indicated in the composition listed in Table 1, Comparative Example 1 did not contain antimony-doped tin oxide or carbon black. The curing conditions employed are given in Table 2.

TABLE 1

| Sample | THV 200A | ZnO | Amino-siloxane | FEP | CMP375 Tin oxide | Carbon black |
|---|---|---|---|---|---|---|
| Example 1 | 100 | 3 | 14 | 44 | 8 | 2 |
| Example 2 | 100 | 3 | 14 | 44 | 8 | 0 |
| Example 3 | 100 | 3 | 14 | 44 | 8 | 2 |
| Comparative Example 1 | 100 | 3 | 14 | 44 | 0 | 0 |

TABLE 2

| Sample | Post Cured | Max. Temp. For Curing |
|---|---|---|
| Example 1 | No | 25° C. |
| Example 2 | No | 25° C. |
| Example 3 | Yes | 275° C. |
| Comparative Example 1 | No | 25° C. |

DMA: Testing Method

The samples were tested on a Rheometrics RSA II Dynamic Mechanical Analyzer (DMA) and required a sample geometry of 7.5 mm×23 mm with a thickness between 30 microns to 2000 microns. The free standing films were tested at 10Hz and a strain of 0.07%. The test was recorded over a temperature scan of −100° C. to 200° C. Over the temperature scan an oscillatory strain is applied to the sample and the resulting stress is measured. These values are related to material properties by E′ and E″ (Storage and Loss Moduli, respectively). As a result of DMA testing, the storage modulus (E′) at three different temperatures is determined and the behavior of the material at high temperature is observed.

TABLE 3

| | Storage Modulus Versus Temperature | | |
|---|---|---|---|
| Sample | MPa @ 80° C. | MPa @ 140° C. | MPa @ 175° C. |
| Example 1 | 28.0 | 7.05 | 7.05 |
| Example 2 | 20.0 | 4.50 | 4.50 |
| Example 3 | 11.5 | 4.8 | 4.8 |
| Comparative Example 1 | 11.0 | 0.9 | 0.3 |

Table 3 shows a comparison between the cured fluorocarbon thermoplastic random copolymer compositions of the invention and Comparative Example 1 which did not contain antimony-doped tin oxide. The comparative example, despite containing the bisphenol residue curing agent, did not cure at low temperature because it did not contain the antimony-doped tin oxide which apparently acts as an accelerator for curing. In terms of the modulus at 175° C., the cured fluorocarbon thermoplastic random copolymer compositions of the invention provide a significant improvement in mechanical properties at the high temperature. Also, the compositions of the invention can also be cured at conventional high temperatures as in Example 3 without any significant deleterious effect on properties.

The invention has been described in detail with particular reference to certain preferred embodiments thereof, but it should be appreciated that variations and modifications can be effected within the scope of the invention.

What is claimed is:

1. A method of preparing a composition containing a fluorocarbon thermoplastic random copolymer comprising the steps of:
   (A) providing a mixture having:
      (i) a fluorocarbon thermoplastic random copolymer having subunits of:

$—(CH_2CF_2)x—$, $—(CF_2CF(CF_3)y—$, and $—(CF_2CF_2)z—$, wherein
      x is from 1 to 50 or 60 to 80 mole percent,
      y is from 10 to 90 mole percent,
      z is from 10 to 90 mole percent,
      x +y+z equals 100 mole percent;
      (ii) a filler comprising zinc oxide;
      (iii) a curable amino functional polydimethyl siloxane copolymer comprising aminofunctional units selected from the group consisting of (aminoethylaminopropyl) methyl, (aminopropyl) methyl and (aminopropyl) dimethyl; and
      (iv) antimony-doped tin oxide particles;
      (v) a bisphenol residue curing agent; and
   (B) curing the mixture for 5 to 10 hours at a temperature in the range of 25° C. to 275° C.

2. The method of claim 1 wherein the aminosiloxane is an amino functional polydimethyl siloxane copolymer.

3. The method of claim 2 wherein the amino functional polydimethyl siloxane copolymer comprises amino functional units selected from the group consisting of (aminoethylaminopropyl) methyl, (aminopropyl) methyl and (aminopropyl) dimethyl.

4. The method of claim 1 wherein the amino siloxane has a total concentration of from 1 to 20 parts by weight per 100 parts of the fluorocarbon thermoplastic random copolymer.

5. The method of claim 1 wherein the zinc oxide has a total concentration of from 1 to 20 parts by weight per 100 parts of the fluorocarbon thermoplastic random copolymer.

6. The method of claim 1 wherein the zinc oxide has a total concentration in the layer of from 3 to 15 parts by weight per 100 parts of the fluorocarbon thermoplastic random copolymer.

7. The method of claim 1 wherein the fluorocarbon thermoplastic random copolymer is cured by bisphenol residues.

8. The method of claim 1 wherein the fluorocarbon thermoplastic random copolymer is nucleophilic addition cured.

9. The method of claim 1 wherein x is from 30 to 50 mole percent, y is from 10 to 90 mole percent, and z is from 10 to 90 mole percent.

10. The method of claim 1 wherein x is from 40 to 50 mole percent and y is from 10 to 15 mole percent.

11. The method of claim 1 wherein z is greater than 40 mole percent.

12. The method of claim 1 wherein the antimony-doped tin oxide particles have a total concentration of from 3 to 20 parts by weight per 100 parts of the fluorocarbon thermoplastic random copolymer.

13. The method of claim 1 wherein antimony-doped tin oxide particles comprise 3 to 10 weight percent antimony.

14. The method of claim 1 wherein the fluorocarbon thermoplastic random copolymer further comprises a fluorinated resin.

15. The method of claim 14 wherein the fluorinated resin has a number average molecular weight of between 50,000 to 50,000,000.

16. The method of claim 14 wherein the fluorinated resin is polytetrafluoroethylene or fluoroethylenepropylene.

17. The method of claim 1 wherein the mixture is cured for 5 to 10 hours at a temperature in the range of 25° C. to 275° C.

18. The method of claim 1 wherein the mixture is cured for 5 to 10 hours at a temperature in the range of 25° C. to 120° C.

19. The method of claim 1 wherein the mixture is cured for 10 hours at a temperature of about 25° C.

20. A method of preparing a coating composition for a substrate comprising the steps of:
   a) providing a mixture having:
      i) a fluorocarbon thermoplastic random copolymer having subunits of:

$$-(CH_2CF_2)x-, -(CF_2CF(CF_3))y-, \text{ and } -(CF_2CF_2)z-,$$

wherein
      x is from 1 to 50 or 60 to 80 mole percent,
      y is from 10 to 90 mole percent,
      z is from 10 to 90 mole percent,
      x+y+z equals 100 mole percent;
     ii) a filler comprising zinc oxide;
     iii) a curable amino functional polydimethyl siloxane copolymer comprising aminofunctional units selected from the group consisting of (aminoethylaminopropyl) methyl, (aminopropyl) methyl and (aminopropyl) dimethyl; and
     iv) and antimony-doped tin oxide;
     v) a bisphenol residue curing agent;
   b) providing a substrate;
   c) coating the substrate with the composition in an organic medium;
   d) allowing the composition to dry on the substrate at ambient or elevated temperatures; and
   e) curing the composition for 5 to 10 hours at a temperature in the range of 25° C. to 275° C.

\* \* \* \* \*